United States Patent
Calvert et al.

(10) Patent No.: US 10,093,302 B2
(45) Date of Patent: Oct. 9, 2018

(54) SUPPLEMENTAL HYDRAULIC MOTOR FOR CONTINUOUSLY VARIABLE TRANSMISSION

(71) Applicant: Caterpillar Inc., Peoria, IL (US)

(72) Inventors: Glen P. Calvert, Metamora, IL (US); Gaurav Vasudeva, Peoria, IL (US); Daniel G. Wear, East Peoria, IL (US)

(73) Assignee: Caterpillar Inc., Deerfield, IL (US)

( * ) Notice: Subject to any disclaimer, the term of this patent is extended or adjusted under 35 U.S.C. 154(b) by 293 days.

(21) Appl. No.: 14/962,001

(22) Filed: Dec. 8, 2015

(65) Prior Publication Data

US 2017/0158187 A1    Jun. 8, 2017

(51) Int. Cl.

| F16H 47/04 | (2006.01) |
|---|---|
| B60W 20/10 | (2016.01) |
| B60W 10/04 | (2006.01) |
| B60W 10/101 | (2012.01) |
| B60K 6/543 | (2007.10) |
| F16H 61/421 | (2010.01) |
| F16H 61/44 | (2006.01) |

(52) U.S. Cl.
CPC ............ *B60W 20/10* (2013.01); *B60K 6/543* (2013.01); *B60W 10/04* (2013.01); *B60W 10/101* (2013.01); *F16H 47/04* (2013.01); *F16H 61/421* (2013.01); *B60W 2710/09* (2013.01); *B60W 2710/105* (2013.01); *B60Y 2400/72* (2013.01); *F16H 61/44* (2013.01); *F16H 2047/045* (2013.01); *Y10S 903/918* (2013.01)

(58) Field of Classification Search
CPC .................................................. F16H 2047/045
See application file for complete search history.

(56) References Cited

U.S. PATENT DOCUMENTS

| 3,496,803 A * | 2/1970 | Whelahan ............... F16H 47/04 180/6.7 |
|---|---|---|
| 3,503,278 A * | 3/1970 | Livezey .................... B60K 5/08 475/23 |
| 3,545,303 A * | 12/1970 | Whelahan .............. B62D 11/18 475/19 |
| 5,166,877 A | 11/1992 | Ishikawa et al. |
| 6,336,518 B1 * | 1/2002 | Matsuyama ........ F16H 61/4078 180/306 |
| 7,070,531 B2 | 7/2006 | Ishizaki |
| 2005/0054469 A1 * | 3/2005 | Dyck ..................... B62D 11/18 475/85 |
| 2010/0065358 A1 * | 3/2010 | Harris ...................... B60K 6/48 180/65.265 |

FOREIGN PATENT DOCUMENTS

| JP | 200791090 | 4/2007 |
|---|---|---|
| JP | 2010058645 | 3/2010 |

* cited by examiner

*Primary Examiner* — Tisha D Lewis
(74) *Attorney, Agent, or Firm* — Shook, Hardy & Bacon

(57) ABSTRACT

A supplemental hydraulic motor is provided that is coupled to an output of a continuously variable transmission in order to increase transmission output torque. The supplemental hydraulic motor is powered by a hydraulic steering pump and is also operational as a ground-driven, secondary hydraulic steering pump. In addition, the supplemental hydraulic motor may be used to retard the transmission.

19 Claims, 4 Drawing Sheets

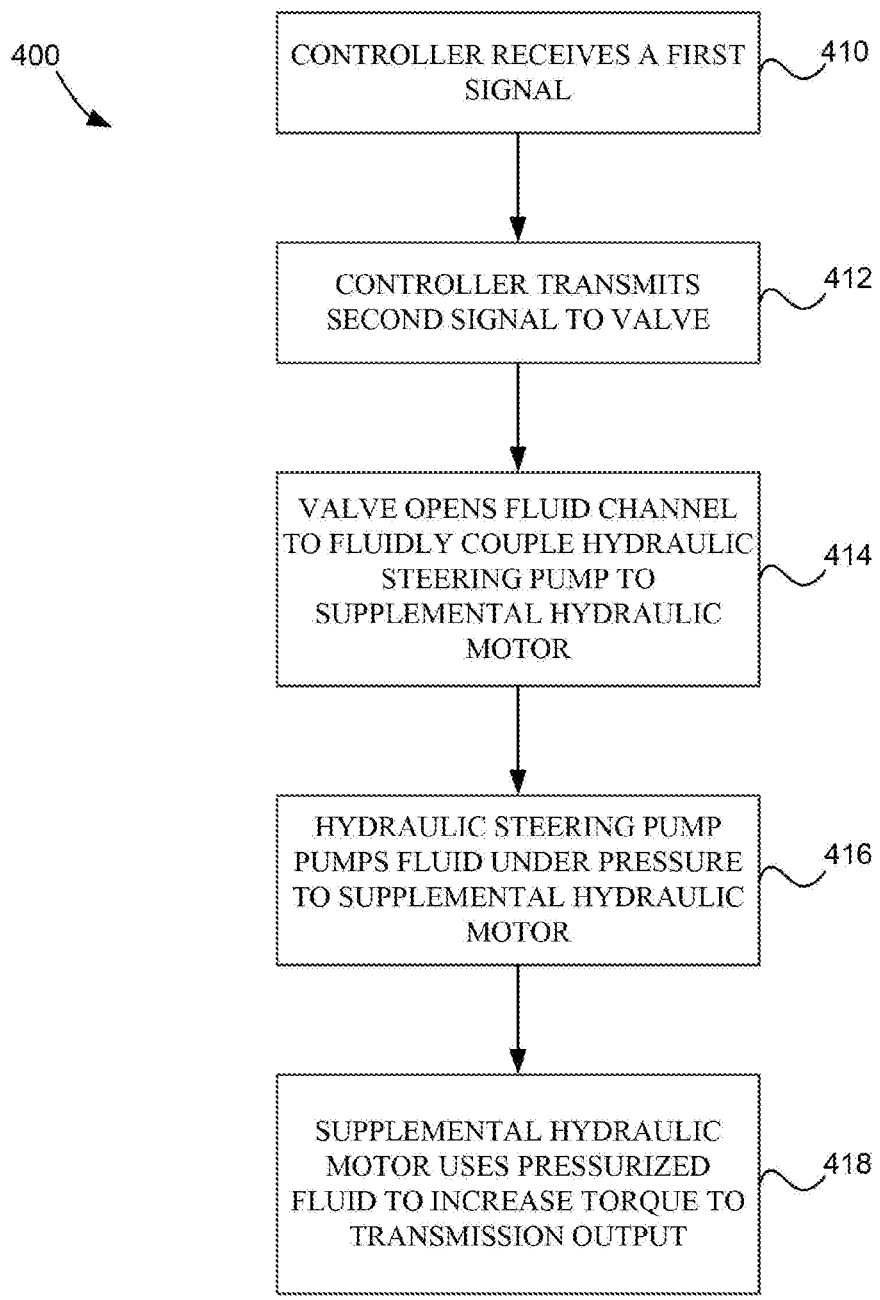

US 10,093,302 B2

SUPPLEMENTAL HYDRAULIC MOTOR FOR CONTINUOUSLY VARIABLE TRANSMISSION

TECHNICAL FIELD

This disclosure relates generally to a system and method for increasing torque in a continuously variable transmission.

BACKGROUND

Construction and other industrial machines often include a parallel path variator transmission, which provides a continuously variable output. Variators can have pressure limits that affect peak power, torque, and rimpull. In order to increase performance across the various parameters multiple variators may be utilized. But multiple variators can add significant system costs.

SUMMARY

One aspect of the present disclosure relates to a system for increasing transmission output. The system includes an input shaft for receiving a rotational input from a primary power source. A mechanical transmission is coupled to the input shaft, the mechanical transmission including a planetary gear arrangement and an output shaft. The output shaft receives at least a portion of the rotational input by way of an output gear set. A hydraulic steering pump is coupled to the input shaft and fluidly coupled to a hydraulic steering system by a first set of one or more fluid lines. In addition, a supplemental hydraulic motor is fluidly coupled to the hydraulic steering pump by a second set of one or more fluid lines. The supplemental hydraulic motor includes a supplemental-motor output gear in a meshed relationship with the transmission output gear set. The system includes a first valve coupled to the second set of fluid lines between the hydraulic steering pump and the supplemental hydraulic motor, the first valve being electronically coupled to a controller.

Another aspect of the present disclosure relates to a machine having a primary power source and a continuously variable transmission. The continuously variable transmission includes a variator and a mechanical transmission, and the variator is coupled to a planetary gear arrangement of the mechanical transmission. The continuously variable transmission also includes a transmission output gear set. An output shaft is coupled to the transmission output gear set, and a set of ground-engaging equipment is coupled to the output shaft. A hydraulic steering pump is coupled to the input shaft and is fluidly coupled to a hydraulic steering system by a first set of one or more fluid lines. In addition, a supplemental hydraulic motor is fluidly coupled to the hydraulic steering pump by a second set of one or more fluid lines, the supplemental hydraulic motor including a supplemental-motor output gear in a meshed relationship with the transmission output gear set. The supplemental hydraulic motor increases rimpull at the set of ground-engaging equipment by increasing torque provided to the output shaft by way of the transmission output gear set.

A further aspect of the present disclosure includes a method of increasing an amount of torque provided to an output shaft of a continuously variable transmission. The method includes receiving by a controller a first signal. The controller transmits a second signal to a valve, which opens a fluid channel. The fluid channel fluidly couples a hydraulic steering pump to a supplemental hydraulic motor. The hydraulic steering pump pumps a hydraulic fluid under pressure through the fluid channel and to the supplemental hydraulic motor. The supplemental hydraulic motor uses the hydraulic fluid under pressure to rotate a supplemental-motor output gear, which is in a meshed relationship with a transmission output gear set.

BRIEF DESCRIPTION OF THE DRAWINGS

FIG. 4 provides a flow diagram outlining a method in accordance with the present disclosure.

DETAILED DESCRIPTION

This disclosure generally relates to systems that utilize a continuously variable transmission to connect a power source to ground-engaging equipment (e.g., wheels). These systems include various types of machines, such as machines used for mining, construction, farming, transportation, and the like. Exemplary machines include a wheel loader (or other type of loader), excavator, dump truck, backhoe, motor grader, material handler, and the like.

Generally, an aspect of the present disclosure increases torque of the continuously variable transmission by utilizing a supplemental motor. The supplemental hydraulic motor is connected to an output of the continuously variable transmission and is powered by a hydraulic steering pump. In addition, the supplemental hydraulic motor may be ground-driven by way of the transmission output to provide a secondary hydraulic steering pump. In a further aspect, the supplemental hydraulic motor may provide a transmission-retarding functionality.

Figure 1:
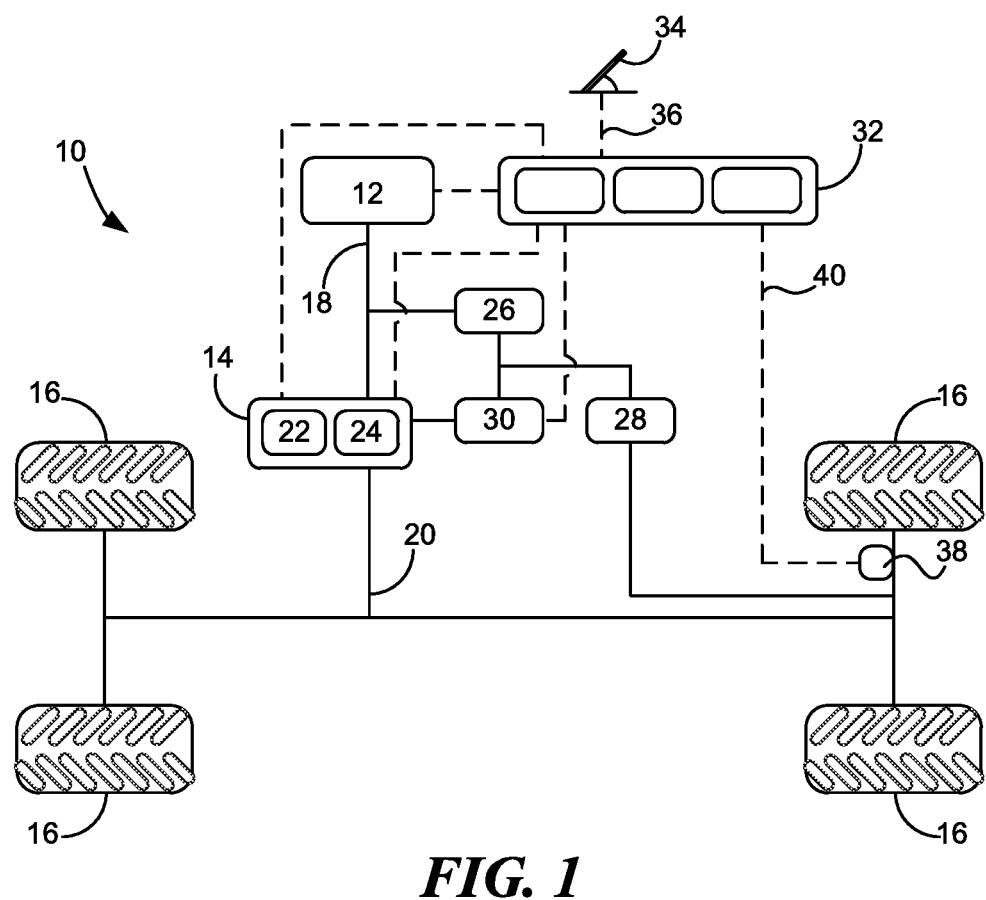
FIG. 1 includes a schematic diagram of a machine in accordance with an aspect described in the present disclosure.

Referring to FIG. 1, a schematic diagram of a machine 10 is provided. The machine 10 includes a primary power source 12, such as an internal combustion engine (e.g., diesel engine, gasoline engine, and gaseous-fuel driven engine), an electric motor, or other source of rotational power. In addition, the machine 10 includes a transmission 14 that links the primary power source 12 to ground-engaging members, which are illustratively depicted as wheels 16.

At a high level, the primary power source 12 provides a rotational input 18 to the transmission 14, which converts the rotational input 18 into a rotational output 20 used to rotate the wheels 16. For instance, the rotational output 20 may be provided in a forward direction or reverse direction and may be further controlled using a set of gears within the transmission 14. The transmission 14 is a continuously variable transmission having a variator 22 and a mechanical transmission 24, the variator 22 varying the overall ratio of the mechanical transmission 24. The rotational output 20 may be transferred to the wheels 16 using various systems, such as by using a splitter that transfers the rotational output 20 to a drive shaft for each axle. Each drive shaft may then provide power to a respective axle by way of a respective differential. The machine 10 includes other components that receive the rotational input 18 provided by the primary power source 12. For instance, as previously indicated, the machine 10 includes the variator 22 that receives a portion of the rotational input 18. In addition, the machine 10 includes a hydraulic steering pump 26 that receives a portion of the rotational input and that is fluidly coupled to a hydraulic steering system 28.

The variator 22 may include a variable-displacement hydraulic pump that is fluidly interconnected with, and arranged to operate, a hydraulic motor (e.g., variable displacement hydraulic motor). As such, the variator 22 may have pressure limits that affect peak power, torque, and rimpull of the machine 10. In accordance with an aspect of the present disclosure, the machine 10 includes a supplemental hydraulic motor 30 that is coupled to the transmission 14 (e.g., to the output gears of the transmission) and that is hydraulically powered by the hydraulic steering pump 26. The supplemental hydraulic motor 30 may be selectively engaged to increase a torque of the rotational output 20.

These various components of FIG. 1 are described in a context of using a primary power source 12 to rotate ground-engaging equipment by way of a transmission 14. The machine 10 may also include a ground-driven operational state in which the ground-engaging equipment may provide a rotational input back to the transmission 14, such as when the machine is coasting downhill. In another aspect of the present disclosure, the supplemental hydraulic motor 30 is usable as secondary, ground-driven hydraulic steering pump (i.e., in a ground-driven operational state) that is useable to provide fluid to the hydraulic steering system 28 in the event that the hydraulic steering pump 26 (i.e., primary hydraulic steering pump) is providing insufficient flow (e.g., low pressure). Furthermore, the supplemental hydraulic motor 30 may be used as a transmission retarder to help diffuse the ground-driven rotational force provided to the transmission, as is described in other portions of this disclosure.

The machine 10 includes various controls and sensors that help to regulate operation of the machine 10. For instance, the machine 10 includes a controller 32 that is electrically and electronically coupled to various components of the machine 10. The controller monitors and controls the function of various systems within the machine 10, such as by receiving and monitoring sensor readings provided by various sensors and by transmitting commands to various components to adjust engine speed, load output, and other operations. The controller 32 may be an electronic control module and may include one or more processors or microprocessors, a memory, a data storage device, a communications hub, and the like. The controller 32 is configured to send and receive signals from various components of the machine in any signal format, such as including a current or a voltage level.

As depicted in FIG. 1, the controller 32 may receive inputs or signals from various sources. Sometimes, these inputs trigger an output or command from the controller 32 to another component. For example, the controller 32 receives signals from an accelerator-pedal sensor 34 by way of a throttle communication channel 36. As such, the manipulation of the accelerator pedal (e.g., by an operator) transmits one or more signals to the controller 32 indicating a desired ground speed of the machine 10 or an amount of torque requested against a ground surface. In addition, the controller 32 receives ground-speed information from a ground-speed sensor 38 by way of ground-speed communication channel 40. Based on the signal(s) received from at least the accelerator-pedal sensor 34 and the ground-speed sensor 38 (and possibly from other sources), the controller 32 may transmit commands to the primary power source 12, to the transmission 14, to the variator 22, or to the supplemental hydraulic motor 30 in order to adjust an operation of the machine. This is merely one example of the controller 32 receiving one or more inputs and transmitting one or more commands to adjust an operation of the machine 10. Other functions of the controller 32 are described in other portions of this disclosure.

Figure 2:
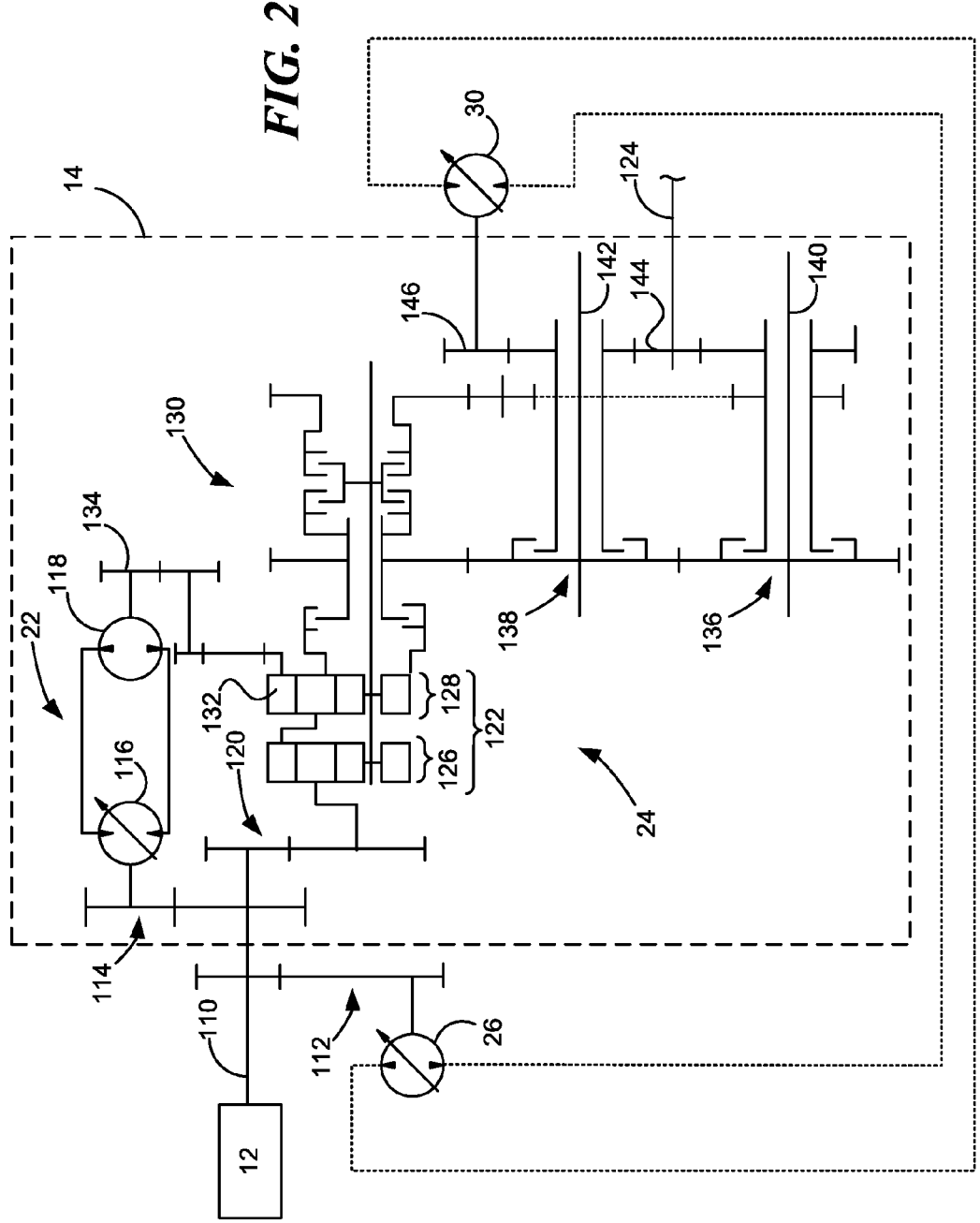
FIG. 2 provides a diagram of a transmission in accordance with the present disclosure.

In FIG. 2 a schematic diagram illustrates some additional details of the transmission 14, the variator 22, the mechanical transmission 24, the hydraulic steering pump 26, and the supplemental hydraulic motor 30 in accordance with an aspect of the present disclosure. An input shaft 110 provides a rotational input, such as the rotational input 18 described with respect to FIG. 1. The input shaft 110 includes a steering-pump input gear set 112 connected to the hydraulic steering pump 26. The input shaft 110 is also connected to a variator input gear set 114 that drives a variator 22, which in the illustrated embodiment includes a variable-displacement hydraulic pump 116 that is fluidly interconnected with and arranged to operate a variable-displacement hydraulic motor 118. The input shaft 110 is also connected to a mechanical-transmission input gear 120. As such, the rotational input provided to the transmission 14, can be split into power provided to the variator 22 and to a mechanical transmission 24.

The mechanical transmission 24 includes a planetary gear arrangement 122 that is mechanically coupled to an output shaft 124 by way of a series of various gears, shafts, sleeves, clutches, and other components. For instance, the planetary gear arrangement 122 includes a first axially aligned planetary gear set 126 and second axially aligned planetary gear set 128, as well as a planetary output shaft 130. Each planetary gear set includes a respective sun gear, a carrier, and a ring gear. In addition, the ring gear 132 of the second planetary gear set 128 is connected to a variator output gear 134 of the hydraulic motor 118 of the variator 22, such that the ring gear 132 receives the variator rotational output. The planetary gear arrangement 122 and the variator 22 provide a rotational output to the planetary output shaft 130, which transfers the rotational output to a forward output system 136 or a reverse output system 138. Although not explicitly described in this disclosure, the planetary output shaft may include gearing components that provide high, low, and other gear settings.

The forward output system 136 includes a forward output member 140, and the reverse output system 138 includes a reverse output member 142. Both the forward output member 140 and the reverse output member 142 are coupled to a transmission output gear set 144, which couples the forward output member 140 and the reverse output member 142 to the output shaft 124. The forward output member 140 provides a driving motion in the forward machine travel direction, and the reverse output member 142 provides a driving motion in the reverse machine travel direction. The arrangement of the transmission 14 illustrated in FIG. 2 is exemplary, and various other transmission arrangements may be utilized in other aspects of the disclosure.

In operation, the input shaft 110 delivers split input power to the variator 22 and to the planetary gear arrangement 122. A hydro-mechanical output power is provided for application to a load, such as one or more driving wheels (e.g., FIG. 1, wheels 16) of a machine. The speed and torque in each of the power ranges initially set by gear ratios of the planetary gear arrangement 122 is variable by varying the stroke of the hydraulic pump 116 of the variator 22.

As previously explained, the variator 22 can have pressure limits that may affect peak power, torque, and rimpull. As such, an aspect of the disclosure includes a supplemental hydraulic motor 30 (e.g., variable-displacement hydraulic motor) that is coupled to the transmission output gear set 144. For example, the supplemental hydraulic motor 30 may be coupled to the transmission output gear set 144 by way of a supplemental-motor output gear 146 that is meshed with the transmission output gear set 144. The supplemental hydraulic motor 30 is hydraulically powered by the hydraulic steering pump 26 and is selectively engageable to apply additional torque to the transmission output gear set 144. For example, the supplemental hydraulic motor 30 may be manually actuated by an operator by manually engaging a switch. In addition, the supplemental hydraulic motor 30 may be automatically actuated by the controller when the controller determines that additional torque is needed. These and other aspects of the supplemental hydraulic motor 30 will be further described with respect to FIG. 3.

Figure 3:
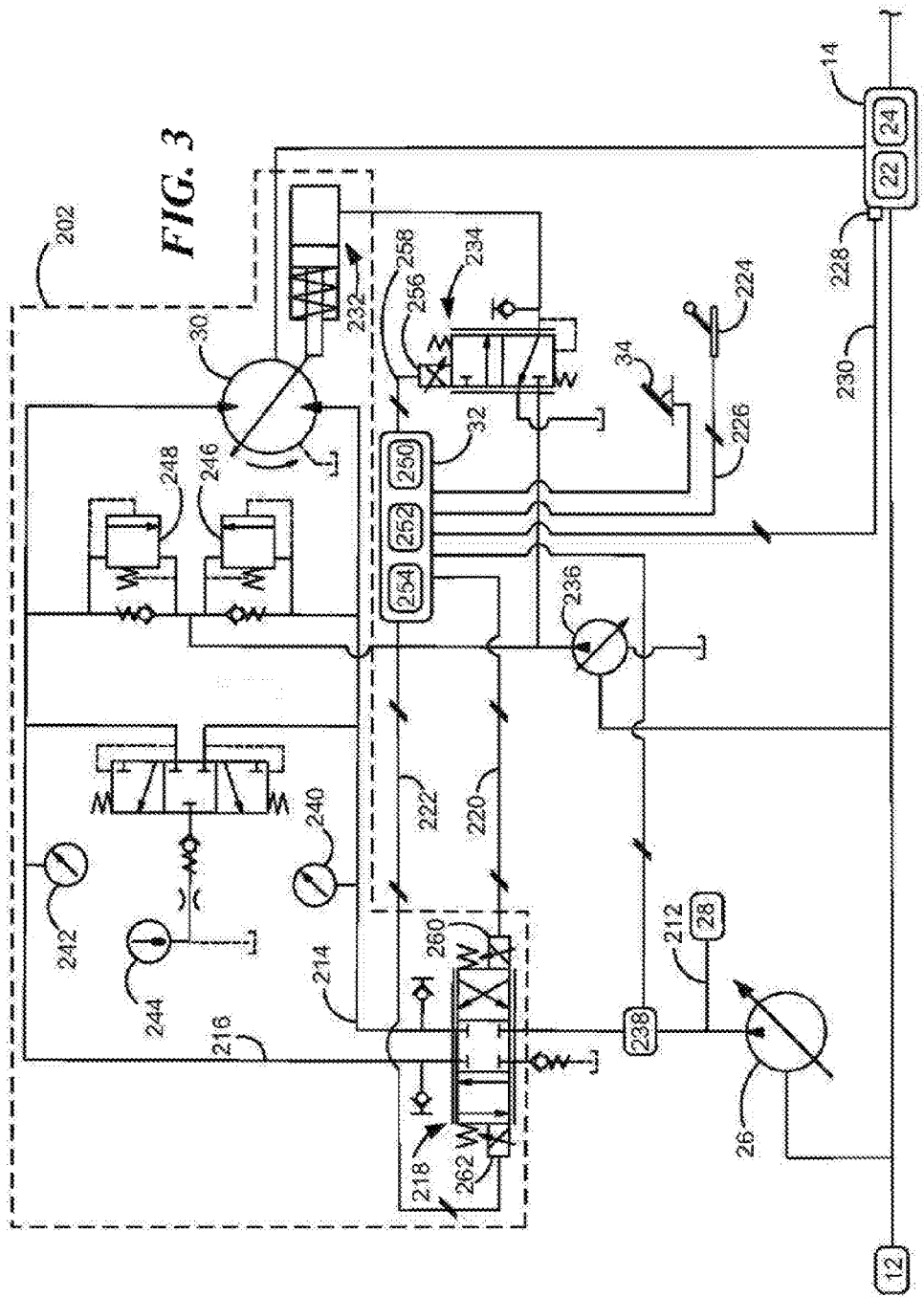
FIG. 3 provides a schematic illustration of at least part of a hydraulic circuit in accordance with the present disclosure.

FIG. 3 provides a diagram of components that are linked mechanically, hydraulically, and/or electronically and that might be used to operate the supplemental hydraulic motor 30 in accordance with an aspect of this disclosure. Generally, FIG. 3 includes the primary power source 12 coupled to the transmission 14 and the hydraulic steering pump 26, such as in the exemplary manner described with respect to FIG. 2. In addition, the hydraulic steering pump 26 is hydraulically coupled to the hydraulic steering system 28 by a first set of fluid lines 212 and to the supplemental hydraulic motor 30 by a second set of fluid lines 214 and 216. Further, the supplemental hydraulic motor 30 is coupled to the output of the transmission 14 in order to selectively increase torque. Several of the components illustrated in FIG. 3 are connected to the controller 32 by way of various communication links.

In accordance with an aspect of the present disclosure, a valve 218 is coupled to the second set of fluid lines 214 and 216 and between the hydraulic steering pump 26 and the supplemental hydraulic motor 30. In an aspect of the present disclosure, the valve 218 includes a directional control valve that can allow flow to pass from the hydraulic steering pump 26 to the supplemental hydraulic motor 30, as well as from the supplemental hydraulic motor 30 to the hydraulic steering system 28. In addition, the valve 218 can selectively allow flow in either of lines 214 or 216. The supplemental hydraulic motor 30, the valve 218, and the fluid lines 214 and 216 are illustrated within a broken-line box to illustratively convey that these components may be part of a hydraulic circuit 202. However, the hydraulic circuit 202 may include a variety of other components not expressly described or depicted in FIG. 3.

The valve 218 includes communication links 220 and 222 that link the valve 218 to the controller 32. In accordance with an aspect of the present disclosure, the controller 32 controls an operation of the valve 218 by sending signals to the valve 218 by way of the communication links 220 and 222. The valve 218 depicted in FIG. 3 includes solenoids 260 and 262 that can be actuated by a signal from the controller 32, and other electronic controls may also be used. For instance, the controller 32 may receive an input or signal from a lever, button, or other manually activatable switch 224 that can be manually selected by an operator and that transmits input to the controller 32 by way of a communication link 226. In response to the signal from the switch 224, the controller 32 may send a signal to the valve 218 (e.g., to the solenoid) to move between an opened state and blocked state to configure the various ports based on a desired functionality (e.g., allow flow to supplemental hydraulic motor 30 or allow flow to tank).

In another aspect, the controller 32 may automatically control an operation of the valve 218 by sending one or more signals to the valve 218 in response to one or more machine operating parameters that are detected or measured by sensors. For example, the controller includes a torque module 250 that processes the various machine operating parameters to determine additional torque is being requested or would improve machine performance. For example, the torque module 250 may receive input from one or more transmission sensors 228 that measure or detect an operational status of the transmission 14 and that transmit the signals to the controller 32 by way of a communication link 230. In addition, the torque module 250 may receive input from the accelerator-pedal sensor 34 and the ground-speed sensor 38, as described with respect to FIG. 1. The torque module 250 may apply an algorithm to the one or more machine operating parameters to determine when the supplemental hydraulic motor should be actuated to increase torque provided to the output gear set.

Once the valve 218 is opened to allow flow from the hydraulic steering pump 26 to the supplemental hydraulic motor 30, the supplemental hydraulic motor 30 is powered and can increase the torque to the transmission (i.e., to the output gear set). As depicted in FIG. 3, the supplemental hydraulic motor 30 is a variable displacement hydraulic motor. As such, a hydraulic actuator 232 is coupled to the supplemental hydraulic motor 30 to control an amount of displacement. For instance, once additional torque is no longer requested, then the valve 218 may be closed, and the hydraulic actuator 232 may destroke the supplemental hydraulic motor 30, such that the supplemental hydraulic motor 30 is not pumping or motoring and is in a freewheeling state.

The hydraulic actuator 232 is fluidly coupled to a charge pump 236, which may also be powered by an input from the primary power source 12. In addition, flow between the charge pump 236 and the hydraulic actuator 232 is regulated by another valve 234, which is also controlled by the controller 32 by way of a communication link 258. The other valve 234 also includes a solenoid 256, and an alternative electronic control may also be used. By controlling the valve 234, flow can either be provided from the hydraulic actuator 232 to the tank or between the hydraulic actuator 232 and the charge pump 236 to either upstroke or destroke the supplemental hydraulic motor 30. As such, by controlling the valve 234 and the hydraulic actuator 232, the torque provided to the transmission 14 can be controlled.

In a further aspect of the present disclosure, the supplemental hydraulic motor 30 can function as a secondary hydraulic steering pump if the pressure provided by the hydraulic steering pump 26 to the hydraulic steering system 28 is insufficient or fails to meet a threshold. As such, the supplemental hydraulic motor 30 that is used to increase output power can also be used to reduce costs related to a separate electric-motor-driven secondary pump or a separate ground-driven pump.

The supplemental hydraulic motor 30 may be activated as a secondary hydraulic steering pump in various manners. For example, a pressure sensor 238 measures a pressure of flow provided by the hydraulic steering pump 26, and may send the pressure measurements to the controller 32 by way of a communication link. The controller 32 may have a steering module 252 that monitors the hydraulic steering pump 26 performance, as determined through various sensors, and that compares pressure measurements to predetermined thresholds. As such, when the pressure supplied by the hydraulic steering pump 26 is insufficient (e.g., fails to satisfy a pre-determined threshold as determined by the steering module 252), a signal can be sent from the controller 32 to the valve 218 to open the valve 218 in a certain fashion to allow flow from line 214 or line 216 and to the hydraulic steering system 28. That is, when the valve 218 is opened in this fashion and the supplemental hydraulic motor 30 is upstroked (e.g., by the hydraulic actuator 232), fluid is pumped by the supplemental hydraulic motor 30, through one of the lines 214 and 216, and to the hydraulic steering system 28.

The pump functionality of the supplemental hydraulic motor 30 is facilitated in various manners to pump fluid through either of the fluid lines 214 or 216. In an aspect of the present disclosure, the supplemental hydraulic motor 30 is powered by the transmission output, which is ground driven by ground-engaging equipment (e.g., wheels 16). In addition, the controller 32 can send a signal to the valve 234 to control a position of the hydraulic actuator 232, which regulates a stroke of the supplemental hydraulic motor 30.

In a further aspect of the present disclosure, the supplemental hydraulic motor 30 can retard the transmission 14, which may allow transmission components to be reduced in size based on smaller loads. That is, as previously described, the supplemental hydraulic motor 30 is coupled to the transmission output (e.g., to the transmission output gear set). As such, a hydraulic circuit 202 including the supplemental hydraulic motor 30 and the lines 214 and 216 and the valve 218 can be utilized to send at least part of the force provided by the ground-driven transmission output into the hydraulic circuit.

In a further aspect, the transmission-retarding operations of the supplemental hydraulic motor 30 are automatically initiated by the controller 32 based on various inputs. For example, the controller 32 may include a transmission-retarding module 254 that process one or more machine operating parameters, such as the detected ground speed, throttle demand, transmission status, engine status, or any combination thereof, to determine that retarding is desired. The controller 32 may combine the operational features of the supplemental hydraulic motor 30, the hydraulic loop, and the valve 218 to achieve a desired level of retarding. For example, an amount of displacement of the supplemental hydraulic motor 30 may be tuned (i.e., using the hydraulic actuator 232). In addition, the state of the valve 218 could be controlled to either block flow entirely, or flow could be allowed to dump to tank. Furthermore, loop pressure could be detected, such as by using pressure sensors 240 and 242, and displacement of the supplemental hydraulic motor 30 could be adjusted based on the loop pressure.

Various other controls are included in the system to help protect and control the supplemental hydraulic motor 30 and monitor the lines 214 and 216. For example, FIG. 3 includes a temperature sensor 244 that may trigger certain controls or modifications if a temperature threshold is met. In addition, pressure relief valves 246 and 248 may also be used to control the flow and the supplemental hydraulic motor 30.

Referring now to FIG. 4, another aspect of the present disclosure is illustrated by way of a flow chart depicting a method 400 of increasing an amount of torque provided to an output shaft of a continuously variable transmission. When describing the steps of the method, reference may also be made to elements of FIGS. 1-3 for exemplary purposes. The method 400 includes receiving (at step 410) by the controller 32 a first signal. For example, the controller 32 may receive a signal from the switch 224 or from one or more sensors 34, 38, and 228 monitoring various machine operating parameters of the machine 10. Pursuant to the method the controller 32 transmits (at step 412) a second signal to the valve 218. The controller 32 may transmit a signal along at least one of the communication links 220 or 222 to the valve 218 (or to at least one of the solenoids 260 or 262) based on the first signal. The valve opens (at step 414) a fluid channel in response to receiving the second signal, the fluid channel fluidly coupling the hydraulic steering pump 26 to the supplemental hydraulic motor 30. The fluid channel may include one of the fluid lines 214 or 216. In step 416, the hydraulic steering pump 26 pumps a hydraulic fluid under pressure through the fluid channel and to the supplemental hydraulic motor 30. In the method 400, the supplemental hydraulic motor 30 uses (in step 418) the hydraulic fluid under pressure to rotate the supplemental-motor output gear 146, which is in a meshed relationship with a transmission output gear set 144.

INDUSTRIAL APPLICABILITY

The supplemental hydraulic motor and related components for providing increased torque to a continuously variable transmission can be used in a wide variety of machines that include a hydraulic steering pump. The supplemental hydraulic motor may be engaged when additional transmission output torque or machine rimpull is requested. For example, the supplemental hydraulic motor may be manually engaged by an operator or may be automatically engaged by the controller. In addition, once the torque and rimpull is no longer requested, the displacement of the supplemental hydraulic motor may be reduced to also reduce the torque.

In addition, because the supplemental hydraulic motor is fluidly coupled with the hydraulic steering pump and the hydraulic steering system, the supplemental hydraulic motor may also function as a secondary, ground-driven hydraulic steering pump. Operation of the supplemental hydraulic motor as a secondary, ground-driven hydraulic steering pump may be automatically initiated by a pressure sensor and controller that monitor a pressure of the hydraulic steering pump (i.e., primary pump).

Furthermore, because the supplemental hydraulic motor is coupled to the transmission output, the hydraulic circuit may be utilized to retard the transmission. Transmission retarding may also be automatically initiated based on machine operating parameters that are monitored by the controller. Moreover, the amount of retarding is tunable by adjusting different variables of the hydraulic circuit, such as a displacement of the supplemental hydraulic motor, as well as a flow path of the hydraulic fluid.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims.

We claim:

1. A system for increasing transmission output comprising:
an input shaft for receiving a rotational input from a primary power source;
a mechanical transmission coupled to the input shaft, the mechanical transmission including a planetary gear arrangement and an output shaft, the output shaft receiving at least a portion of the rotational input by way of a transmission output gear set;

a hydraulic steering pump coupled to the input shaft and fluidly coupled to a hydraulic steering system by a first set of one or more fluid lines;

a supplemental hydraulic motor fluidly coupled to the hydraulic steering pump and the hydraulic steering system by a second set of one or more fluid lines, the supplemental hydraulic motor including a supplemental-motor output gear in a meshed relationship with the transmission output gear set;

a first valve coupled to the second set of one or more fluid lines between the hydraulic steering pump and the hydraulic steering system and the supplemental hydraulic motor, the first valve being movable between a blocked state where the hydraulic steering pump and the hydraulic steering system are fluidly disconnected from the supplemental hydraulic motor and an opened state where the hydraulic steering pump and the hydraulic steering system are fluidly connected to the supplemental hydraulic motor; and a controller electronically coupled to the first valve,
wherein the controller moves the first valve to the blocked state to fluidly disconnect the hydraulic steering pump from the supplemental hydraulic motor to prevent torque from being transmitted by the supplemental-motor output gear to the transmission output gear set, and
wherein the controller moves the first valve to the opened state to fluidly connect the hydraulic steering pump to the supplemental hydraulic motor to transmit additional torque from the supplemental-motor output gear to the transmission output gear set.

2. The system of claim 1 further comprising, a variator coupled to the input shaft by a variator input gear set, the variator including a variable-displacement hydraulic pump fluidly connected to a hydraulic motor that provides a variator rotational output to a variator output gear, wherein the variator output gear is coupled to the planetary gear arrangement of the mechanical transmission.

3. The system of claim 2 further comprising, a switch that is manually selectable and that coupled to the controller by a communication link,
wherein the switch sends a first signal to the controller when the switch is manually selected,
wherein the controller sends a second signal to the first valve in response to receiving the first signal, and
wherein the first valve changes from the blocked state to the opened state in response to receiving the second signal in order to open a fluid line from the hydraulic steering pump to the supplemental hydraulic motor.

4. The system of claim 2 further comprising, one or more sensors that are coupled to the controller by one or more communication links and that measure one or more machine operating parameters, the controller configured to apply an algorithm to the one or more machine operating parameters to determine when the supplemental hydraulic motor should be actuated to increase torque provided to the transmission output gear set, wherein the controller sends a signal to the first valve when it is determined that the supplemental hydraulic motor should be actuated, and wherein the first valve changes from the blocked state to the opened state when the first valve receives the signal from the controller in order to open a fluid line from the hydraulic steering pump to the supplemental hydraulic motor.

5. The system of claim 1 further comprising, a hydraulic actuator coupled to the supplemental hydraulic motor, the hydraulic actuator affecting an amount of displacement of the supplemental hydraulic motor.

6. The system of claim 5 further comprising, a charge pump fluidly coupled to the hydraulic actuator.

7. The system of claim 6 further comprising, a second valve fluidly coupled between the hydraulic actuator and the charge pump, the second valve coupled to the controller by another communication link and including an electronic control.

8. The system of claim 1 further comprising, a pressure sensor coupled to the first set of one or more fluid lines and electronically coupled to the controller, the pressure sensor communicating a pressure measurement of the hydraulic steering pump to the controller,
wherein the controller sends a signal to the first valve when it is determined by the controller that the pressure measurement satisfies a pre-determined threshold, and
wherein the first valve changes from the blocked state to the opened state when the first valve receives the signal from the controller in order to open a fluid line from the supplemental hydraulic motor to the hydraulic steering system.

9. The system of claim 1, wherein the controller includes a transmission-retarding module that processes one or more machine operating parameters to determine when to initiate one or more transmission-retarding operations of the supplemental hydraulic motor.

10. A machine comprising:
a primary power source;
a continuously variable transmission including a variator and a mechanical transmission, the variator coupled to a planetary gear arrangement of the mechanical transmission, the continuously variable transmission including a transmission output gear set;
an output shaft coupled to the transmission output gear set;
a set of ground-engaging equipment coupled to the output shaft;
a hydraulic steering pump coupled to the input shaft and fluidly coupled to a hydraulic steering system by a first set of one or more fluid lines;
a supplemental hydraulic motor fluidly coupled to the hydraulic steering pump and the hydraulic steering system by a second set of one or more fluid lines, the supplemental hydraulic motor including a supplemental-motor output gear in a meshed relationship with the transmission output gear set, wherein the supplemental hydraulic motor increases rimpull at the set of ground-engaging equipment by increasing torque provided to the output shaft by way of the transmission output gear set; and
a first valve coupled to the second set of one or more fluid lines between the hydraulic steering pump and the hydraulic steering pump and the supplemental hydraulic motor, the first valve being movable between a blocked state where the hydraulic steering pump and the hydraulic steering system are fluidly disconnected from the supplemental hydraulic motor and an opened state where the hydraulic steering pump and the hydraulic steering system are fluidly connected to the supplemental hydraulic motor; and
a controller electronically coupled to the first valve,
wherein the controller moves the first valve to the blocked state to fluidly disconnect the hydraulic steering pump to the supplemental hydraulic motor to prevent additional torque from being transmitted by the supplemental-motor output gear to the transmission output gear set, and wherein the controller moves the first valve to the opened state to fluidly connect the hydraulic steering pump to the supplemental hydraulic motor to transmit additional torque from the supplemental-motor output gear to the transmission output gear set.

11. The machine of claim 10, wherein the controller is coupled to one or more sensors, the one or more sensors communicating to the controller one or more machine operating parameters, wherein the controller applies an algorithm to the one or more machine operating parameters to determine when to open the valve to provide a fluid channel from the hydraulic steering pump to the supplemental hydraulic motor.

12. The machine of claim 10, wherein the controller is coupled to a switch that is manually selectable, the switch providing a first signal to the controller when the switch is selected, wherein the controller provides a second signal to the valve when the first signal is received in order to open the valve to provide a fluid channel from the hydraulic steering pump to the supplemental hydraulic motor.

13. The machine of claim 10, wherein the machine operates in a ground-driven operational state; wherein in the ground-driven operational state the set of ground-engaging equipment drives the output shaft to provide a rotational input to the transmission output gear set; and wherein, in the ground-driven operational state, the rotational input is transferable to the supplemental hydraulic motor.

14. The machine of claim 13, wherein the valve is selectively openable to provide a fluid channel between the supplemental hydraulic motor and the hydraulic steering system, and wherein the rotational input is transferred to the supplemental hydraulic motor to pump fluid through the fluid channel and to the hydraulic steering system.

15. The machine of claim 13 further comprising, a hydraulic circuit at least partially including the supplemental hydraulic motor, the valve, and at least a portion of the second set of one or more fluid lines, wherein the rotational input is transferred to the supplemental hydraulic motor to retard the continuously variable transmission by transferring pressure to the hydraulic circuit.

16. A method of increasing an amount of torque provided to an output shaft of a continuously variable transmission, the method comprising:
receiving by a controller a first signal;
transmitting by the controller a second signal to a valve;
opening by the valve a fluid channel in response to receiving the second signal, the fluid channel fluidly coupling a hydraulic steering pump and a hydraulic steering system to a supplemental hydraulic motor;
pumping by the hydraulic steering pump a hydraulic fluid under pressure through the fluid channel and to the supplemental hydraulic motor; and
using by the supplemental hydraulic motor the hydraulic fluid under pressure to rotate a supplemental-motor output gear, which is in a meshed relationship with a transmission output gear set.

17. The method of claim 16 further comprising,
transferring an input from the transmission output gear set to the supplemental-motor output gear to operate the supplemental hydraulic motor as a pump.

18. The method of claim 17 further comprising, pumping by the supplemental hydraulic motor fluid to a hydraulic steering system when the controller determines that a pressure provided by the hydraulic steering pump does not satisfy a threshold.

19. The method of claim 17 further comprising, pumping by the supplemental hydraulic motor fluid to a hydraulic circuit to retard the continuously variable transmission.

* * * * *